United States Patent
Butala

(10) Patent No.: US 10,277,637 B2
(45) Date of Patent: Apr. 30, 2019

(54) METHODS, SYSTEMS, AND COMPUTER READABLE MEDIA FOR CLEARING DIAMETER SESSION INFORMATION

(71) Applicant: Oracle International Corporation, Redwood Shores, CA (US)

(72) Inventor: Swapnil Mahesh Butala, Bangalore Karnataka (IN)

(73) Assignee: Oracle International Corporation, Redwood Shores, CA (US)

(*) Notice: Subject to any disclaimer, the term of this patent is extended or adjusted under 35 U.S.C. 154(b) by 279 days.

(21) Appl. No.: 15/043,446

(22) Filed: Feb. 12, 2016

(65) Prior Publication Data

US 2017/0237781 A1    Aug. 17, 2017

(51) Int. Cl.
*H04L 29/06* (2006.01)
*H04L 29/08* (2006.01)
*H04L 12/14* (2006.01)
*H04M 15/00* (2006.01)
*H04W 12/06* (2009.01)

(52) U.S. Cl.
CPC ...... *H04L 65/1066* (2013.01); *H04L 12/1403* (2013.01); *H04L 12/1407* (2013.01); *H04L 63/0892* (2013.01); *H04L 67/1029* (2013.01); *H04L 67/1031* (2013.01); *H04L 67/143* (2013.01); *H04M 15/60* (2013.01); *H04M 15/62* (2013.01); *H04M 15/64* (2013.01); *H04M 15/66* (2013.01); *H04M 15/70* (2013.01); *H04M 15/725* (2013.01); *H04M 15/73* (2013.01); *H04M 15/8228* (2013.01); *H04W 12/06* (2013.01); *H04L 67/1036* (2013.01)

(58) Field of Classification Search
CPC .... H04L 67/14; H04L 65/1066; H04M 15/66; H04M 15/8228
See application file for complete search history.

(56) References Cited

U.S. PATENT DOCUMENTS

| 8,793,396 B2* | 7/2014 | Zhou ............... H04L 12/14 709/238 |
| 9,215,133 B2 | 12/2015 | Baniel et al. |
| 2005/0022115 A1 | 1/2005 | Baumgartner et al. |
| 2010/0286490 A1 | 11/2010 | Koverzin |
| 2011/0138005 A1* | 6/2011 | Zhou ............... H04L 12/14 709/206 |

(Continued)

OTHER PUBLICATIONS

Notice of Allowance and Fee(s) Due for U.S. Appl. No. 13/772,286 (dated Aug. 10, 2015).

(Continued)

*Primary Examiner* — Jeong S Park
(74) *Attorney, Agent, or Firm* — Jenkins, Wilson, Taylor & Hunt, P.A.

(57) ABSTRACT

The subject matter described herein includes methods, systems, and computer readable media for clearing Diameter session information. According to one method, the method occurs at a Diameter routing agent (DRA) node. The method includes identifying an inactive Diameter session associated with a Diameter node. The method also includes generating a trigger message for triggering the Diameter node to delete session information associated with the inactive Diameter session. The method further includes sending the trigger message to the Diameter node.

16 Claims, 5 Drawing Sheets

(56) References Cited

U.S. PATENT DOCUMENTS

| | | | |
|---|---|---|---|
| 2011/0165901 A1* | 7/2011 | Baniel | H04M 15/66 |
| | | | 455/500 |
| 2011/0320544 A1 | 12/2011 | Yee et al. | |
| 2012/0099715 A1* | 4/2012 | Ravishankar | H04L 12/1407 |
| | | | 379/114.01 |
| 2012/0221899 A1 | 8/2012 | Cervenak et al. | |
| 2013/0262308 A1 | 10/2013 | Cai et al. | |
| 2014/0086052 A1 | 3/2014 | Cai et al. | |
| 2014/0233368 A1 | 8/2014 | Baniel et al. | |
| 2014/0335815 A1* | 11/2014 | Ephraim | H04M 15/886 |
| | | | 455/406 |
| 2015/0236915 A1* | 8/2015 | Mohammed | H04L 41/0893 |
| | | | 709/223 |

OTHER PUBLICATIONS

Non-Final Office Action for U.S. Appl. No. 13/772,286 (dated Dec. 18, 2014).

"3rd Generation Partnership Project; Technical Specification Group Core Network and Terminals; Policy and Charging Control over Rx reference point (Release 11)," 3GPP TS 29.214 V11.7.0, pp. 1-53 (Dec. 2012).

Fajardo et al., "Diameter Base Protocol," RFC 6733, pp. 1-152 (Oct. 2012).

"Digital cellular telecommunications system (Phase 2+); Universal Mobile Telecommunications System (UMTS); LTE; Policy and charging control: Spending limit reporting over Sy reference point (3GPP TS 29.219 version 11.2.0 Release 11)," ETSI TS 129 219 V11.2.0, pp. 1-22 (Oct. 2012).

Znaty, "Diameter, GPRS, (LTE+ePC=EPS), IMS, PCC and SDM," EFORT (May 2010). (Part 1 of 2, pp. 1-229).

Znaty, "Diameter, GPRS, (LTE+ePC=EPS), IMS, PCC and SDM," EFORT (May 2010). (Part 2 of 2, pp. 230-460).

\* cited by examiner

METHODS, SYSTEMS, AND COMPUTER READABLE MEDIA FOR CLEARING DIAMETER SESSION INFORMATION

TECHNICAL FIELD

The subject matter described herein relates to clearing Diameter session information. More specifically, the subject matter relates to methods, systems, and computer readable media for clearing Diameter session information.

BACKGROUND

In Diameter networks, sessions are often established between policy and charging rules functions (PCRFs) and other nodes. For example, a PCRF may establish Sy sessions with an online charging system (OCS) to monitor policy counters, which govern subscriber spending limits with regard to one or more services. The PCRF may make policy decisions based on the status of the policy counters received from the OCS. In another example, on the Gx interface, a PCRF may send re-authorization request (RAR) messages to policy and charging enforcement functions (PCEF) to re-establish sessions with the PCEFs.

A PCRF reserves memory and other resources associated with each session on each interface that the PCRF supports. Sometimes, a session may become stale. For example, if a session is no longer active or used but a termination message has not been sent by the PCEF or received by the PCRF, the PCRF may not be aware of the termination. A session that is no longer active or used but has not been terminated may be referred to herein as a stale session or an inactive session. As the number of sessions managed by the PCRF increases, wasted resources due to stale sessions can degrade PCRF performance.

Accordingly, a need exists for methods, systems, and computer readable media for clearing Diameter session information.

SUMMARY

The subject matter described herein includes methods, systems, and computer readable media for clearing Diameter session information. According to one method, the method occurs at a Diameter routing agent (DRA) node. The method includes identifying an inactive Diameter session associated with a Diameter node. The method also includes generating a trigger message for triggering the Diameter node to delete session information associated with the inactive Diameter session. The method further includes sending the trigger message to the Diameter node.

According to one system, the system includes a DRA node. The DRA node includes a processor and a memory. The DRA node is configured to identify an inactive Diameter session associated with a Diameter node, to generate a trigger message for triggering the Diameter node to delete session information associated with the inactive Diameter session, and to send the trigger message to the Diameter node.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a non-transitory computer readable medium that implements the subject matter described herein may be located on a single device or computing platform or may be distributed across multiple devices or computing platforms.

As used herein, the term "node" refers to at least one physical computing platform including one or more processors and memory. For example, a node may include a virtual machine and/or other software executing on a physical computing platform.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for clearing Diameter session information. Some network nodes maintain or store session information about Diameter sessions. For example, a policy and charging rules function (PCRF) may store information about one or more Diameter sessions. In this example, the PCRF may clear or delete session information when a Diameter session is terminated or is no longer active, thereby freeing up memory resources at the PCRF.

In accordance with some aspects of the subject matter described herein, techniques, methods, or mechanisms are disclosed for using a Diameter routing agent (DRA) to proactively and/or efficiently trigger a Diameter node to clear or delete stale or inactive Diameter session information. For example, a DRA in accordance with some aspects of the subject matter described herein may determine that a Diameter session is stale (e.g., inactive) and may send a trigger message, such as Diameter credit control request terminate (CCR-T) message or another message, to a PCRF, another DRA, a PCEF, an online charging system (OCS), or other Diameter nodes. In this example, the trigger message may trigger the recipient node to clear or delete corresponding session information stored at or by the recipient node.

Advantageously, in accordance with some aspects of the subject matter described herein, by using a DRA for triggering a Diameter node to clear or delete stale or inactive Diameter session information, the number of messages used to clear Diameter session information can be reduced compared to other techniques. For example, instead of waiting for a PCRF to initiate an audit procedure involving a PCEF, a DRA may generate and send a trigger message for indicating that Diameter session information for one or more Diameter sessions should be deleted or cleared at the PCRF. Further, since the DRA may trigger the clearing of Diameter session information, once the DRA identifies stale or inactive Diameter sessions, it may send trigger messages to one or more Diameter nodes for clearing corresponding session information without having to contact a PCEF. As such, these and/or related features improves scalability and improves resource utilization at various network nodes that maintain session information. In contrast, systems without such features may require higher resource requirements and/or may maintain less session information, which can reduce the efficacy of such systems.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
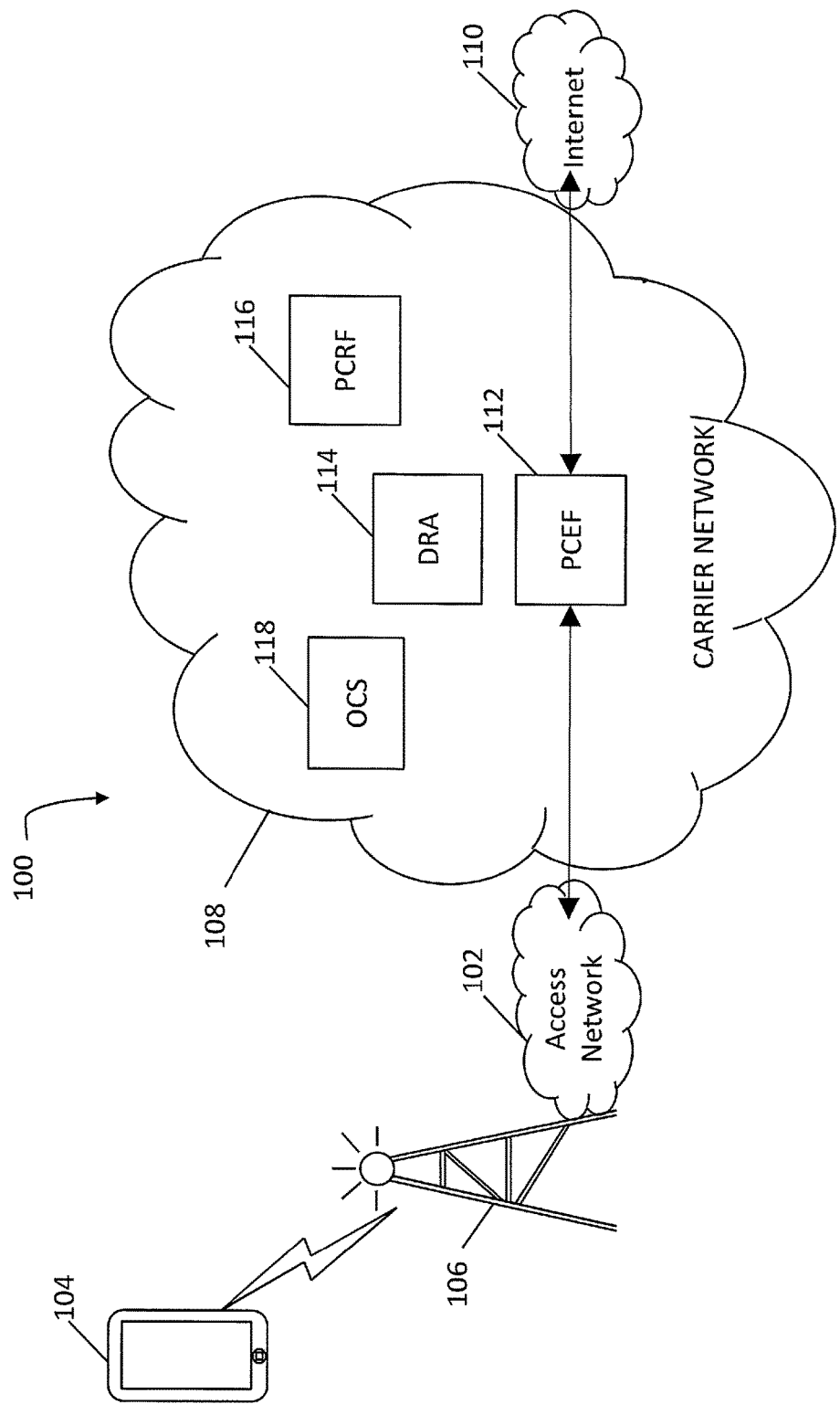
FIG. 1 is a network diagram illustrating a network environment for clearing Diameter session information according to an embodiment of the subject matter described herein.

FIG. 1 is a network diagram illustrating an exemplary network environment 100 for clearing Diameter session information according to an embodiment of the subject matter described herein. Referring to FIG. 1, network environment 100 may include access network 102. Access network 102 may include nodes, functions, devices, and/or components for providing user equipment (UE) 104 access to services, functions, or devices in one or more networks. In one embodiment, access network 102 may be a radio access network (RAN). For example, access network 102 may be a global system for mobile communications (GSM) RAN (GRAN), a general packet radio service (GPRS) access network, a universal mobile telecommunications system (UMTS) RAN (UTRAN), an evolved UTRAN (eU-TRAN), an Internet protocol (IP) connectivity access network (IPCAN), a code division multiple access (CDMA) network, an evolution-information optimized (EV-DO) network, a wideband CDMA (WCDMA) network, a high speed packet access (HPSA) network, an evolved HPSA (EHPSA+) network, or a long term evolution (LTE) access network. Access network 102 may include one or more transceiver nodes 106 for communicating with UE 104. UE 104 may include a computer, a pager, a mobile phone, a smartphone, a wireless modem, or other devices through which a subscriber accesses network services.

Network environment 100 may further include a carrier network 108. Carrier network 108 may include a core network, such as evolved packet core (EPC) network. Carrier network 108 may be utilized by UE 104 to access Internet 110. Carrier network 108 may include a bearer binding and event reporting function (BBERF) node, a service gateway (SGW), or a serving general packet radio service (GPRS) support node (SGSN).

Carrier network 108 may also include a PCEF 112. PCEF 112 may represent a node that serve as a policy enforcement point and may be placed in line between access network 102 and PCRF 116. PCEF 112 may be, for example, a gateway GPRS support node (GGSN) or a PDN gateway. As an enforcement point, PCEF 112 may request and receive policy rules from PCRF 116. Policy rules may take the form of, for example, Gx rules contained in credit control messages.

Carrier network 108 may also include a PCRF 116. PCRF 116 may represent a centralized node that can act as a policy decision point for carrier network 108. PCRF 116 may take operator defined service policies, subscription information pertaining to a user, and other information into account to build policy decisions. Policy decisions may be formulated as policy control and charging (PCC) rules. PCC rules may contain information about user plane traffic expressed as a packet filter. A packet filter may take the form of an IP five-tuple specifying: (1) source IP address(es), (2) destination IP address(es), (3) source port number(s), (4) destination port number(s), and (5) application protocol(s) (e.g., transmission control protocol (TCP), user information gram protocol (UDP)). All IP packets matching a packet filter of a PCC rule may be designated as an SDF.

In some embodiments, PCRF 116 may maintain session information for various Diameter sessions. For example, PCRF 116 may use a data storage device that includes session related information indexed by one or more session identifiers. Some session information that may be maintained by PCRF 116 may include subscriber related details, service and/or flow details, charging related information, and/or information about a related PCEF 112 or other serving nodes.

Carrier network 108 may also include one or more DRAs, such as DRA 114. DRA 114 may represent a suitable entity for routing or relaying Diameter signaling messages, e.g., between various Diameter nodes. DRA 114 may include functionality for processing various messages. DRA 114 may include various communications interfaces for communication with Diameter entities, e.g., 3rd Generation Partnership Project (3GPP) LTE communications interfaces and other (e.g., non-LTE) communications interfaces. In some embodiments, receiving, processing, and/or routing functionality may be included in one or more modules. For example, DRA 114 may include or have access to one or more modules for receiving Diameter signaling messages associated with multiple different Diameter signaling interfaces, e.g., Gx, Gxx, Rx, Sd, Sy, Gy, and/or S9.

In some embodiments, DRA 114 may maintain session information for various Diameter sessions (e.g., a local memory or storage device) that traverse DRA 114 and/or are facilitated by DRA 114. For example, DRA 114 may store session information associated with Gx sessions involving PCEF 112 and PCRF 116, Gy sessions involving PCEF 112 and OCS 118, and Sy sessions between OCS 118 and PCRF 116.

In some embodiments, DRA 114 may include functionality to identify stale or inactive Diameter sessions. For example, DRA 114 may maintain timers or other mechanisms for determining or identifying whether a Diameter session associated with PCEF 112 is stale or inactive. In this example, DRA 114 may identify a Diameter session '5234' as inactive if a time threshold is met or exceeded without activity (e.g., an amount of time elapsing without any messages related to the Diameter session '5234' being received from PCEF 112).

In some embodiments, DRA 114 may include functionality for confirming that a Diameter message is inactive. For example, DRA 114 may communicate with PCEF 112 for determining whether a Diameter session is still active at PCEF 112. In this example, if PCEF 112 indicates that the Diameter session is no longer active, DRA 114 may delete or clear session information associated with the Diameter session that is maintained at or by DRA 114.

In some embodiments, DRA 114 may include functionality to trigger one or more Diameter nodes to delete or clear stale or inactive session information. For example, after determining that a Diameter session is no longer active, DRA 114 may send a trigger message for triggering a Diameter node, such as PCRF 116, to delete or clear corresponding Diameter session information stored at or by the Diameter node.

In some embodiments, a trigger message for clearing stale or inactive session information may include a hypertext transfer protocol (HTTP) message, an extensible markup language (XML) message, a Diameter protocol message, or another type of message. For example, DRA 114 may generate an HTTP message indicating that session information for Diameter session 'X' stored at or by a recipient Diameter node be cleared or deleted. In another example, DRA 114 may generate a credit control request terminate (CCR-T) message that triggers a recipient node to clear corresponding session information stored at or by the recipient node.

In some embodiments, DRA 114 may include functionality for emulating some aspects associated with PCEF 112. For example, DRA 114 may generate a CCR-T message for triggering a Diameter node to clear stale or inactive session information. In this example, the CCR-T message may be generated and sent so as to appear to originate from PCEF 112. In another example, DRA 114 may intercept and/or respond to some messages addressed to or destined for PCEF 112, such as RAR messages associated with an audit procedure.

Carrier network 108 may also include an OCS 118. OCS 118 may perform various charging functions and may maintain session information for various Diameter sessions. For example, OCS 118 may receive information from PCEF 112 and/or other nodes, such as an application function, indicating how much data a subscriber used for a given session and/or what type of services were performed. In this example, OCS 118 may maintain session information while a session is active and may clear the data once the session has ended or is no longer active or once a trigger message is received from DRA 114.

Each network node depicted in FIG. 1 (e.g., PCRF 116, DRA 114, PCEF 112, and/or OCS 118) may include data storage. Data storage may represent any suitable entities (e.g., a non-transitory computer readable medium, embedded memory, or a memory device) for storing session information and other information. For example, data storage associated with PCRF 116 may store session information (e.g., service of flow information, SDF filters, subscriber information, policy information, etc.) and may be indexed by a one or more session identifiers.

In some embodiments, particular data storage may be managed and/or accessible by one or more network nodes. In some embodiments, data storage may be located on a single device or computing platform or may be distributed across multiple devices or computing platforms.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

Figure 2:
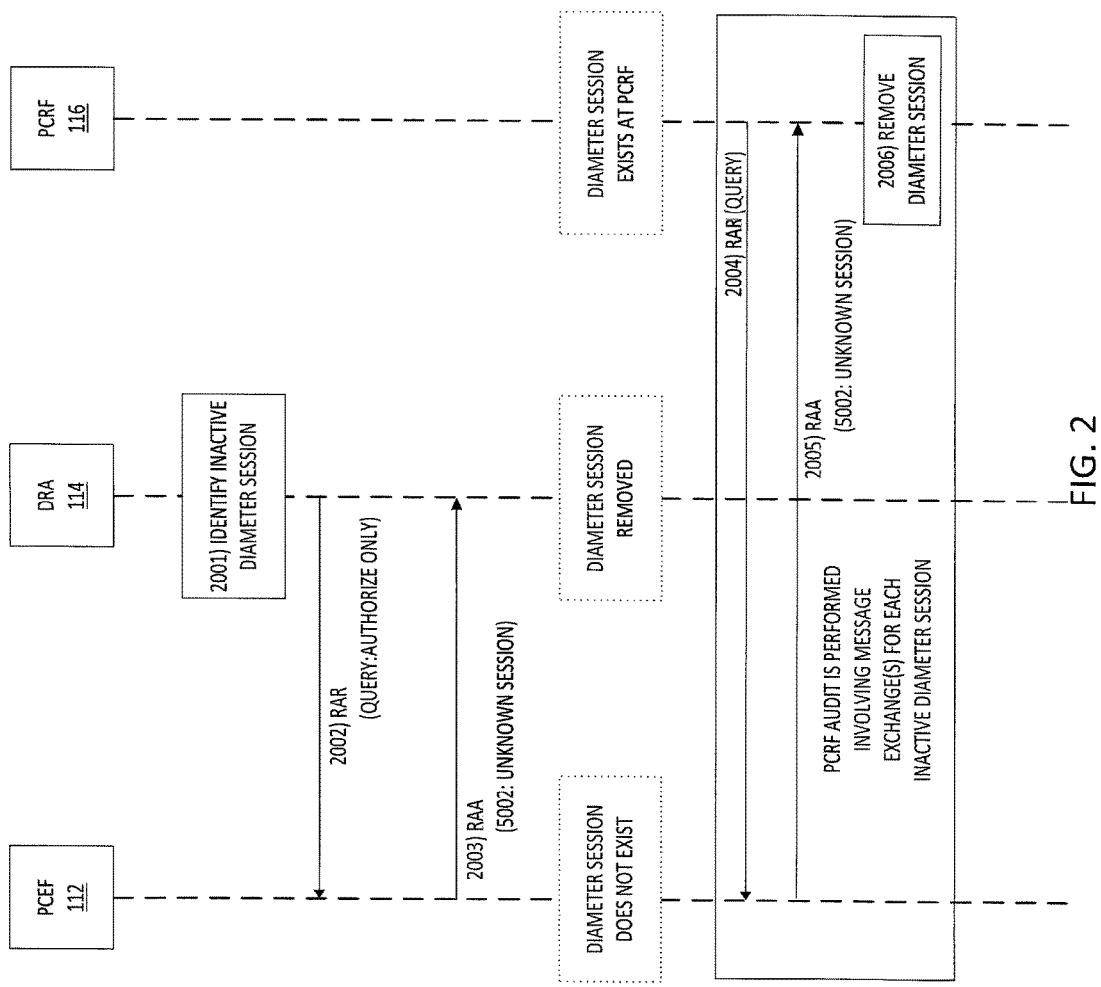
FIG. 2 is a message flow diagram illustrating an audit mechanism for clearing Diameter session information at a policy and charging rules function (PCRF)

FIG. 2 is a message flow diagram illustrating an audit mechanism for clearing Diameter session information at PCRF 116. In some embodiments, DRA 114 may facilitate communications between one or more nodes in carrier network 108. For example, DRA 114 may communicate with PCEF 112 and PCRF 116. In this example, DRA 114 and PCRF 116 may maintain state information and/or session information for various subscribers or UEs associated with PCEF 112.

In step 2001, DRA 114 may identify an inactive Diameter session. For example, DRA 114 may maintain timers or other mechanisms for determining or identifying whether a Diameter session associated with PCEF 112 is stale or inactive. In this example, DRA 114 may identify a Diameter session '5234' as inactive if a time threshold is met or exceeded without activity (e.g., an amount of time elapsing without any messages related to the Diameter session '5234' being received from PCEF 112).

In step 2002, an RAR message may be sent from DRA 114 to PCEF 112 for requesting information about the Diameter session. For example, DRA 114 may send a Diameter RAR message to verify or confirm that the Diameter session is inactive.

In step 2003, a Diameter re-authentication answer or Re-Auth-Answer (RAA) message may be sent from PCEF 112 to DRA 114. For example, in response to receiving an RAR message, PCEF 112 may respond with an RAA message indicating that a particular Diameter session is unknown (e.g., the RAA message may include a Result code of '5002'). In this example, the RAA message may indicate that the Diameter session is unknown if the session is no longer connected or is inactive.

In some embodiments, after receiving an RAA message indicating that a Diameter session is unknown, DRA 114 may delete or clear information associated with the Diameter session. For example, DRA 114 may delete a data entry associated with a stale or inactive Diameter session '5234' in a local data structure or memory accessible by DRA 114.

In some embodiments, after DRA 114 has cleared session information related to an inactive Diameter session, PCRF 116 may be unaware of the Diameter session's inactive status and, as such, may continue to maintain information about the Diameter session, which may be an inefficient use of valuable resources and memory at PCRF 116.

In some embodiments, PCRF 116 may be configured to perform internal audits periodically to clear or delete stale or inactive Diameter session information. For example, every hour, PCRF 116 may perform an internal audit procedure that includes sending an RAR message for each potentially stale Diameter session to PCEF 112, e.g., via DRA 114 or another DRA. In this example, in response to determining that any Diameter sessions are unknown to PCEF 112, PCRF 116 may clean up session information associated with these unknown Diameter sessions at PCRF 116.

In some embodiments, each RAR message may be re-transmitted multiple times. For example, if PCEF 112 does not respond (e.g., because of congestion or overload conditions), within a certain amount of time to an RAR message, PCRF 116 may re-transmit the RAR message until PCEF 112 responds with an RAA message.

At step 2004, during a PCRF audit for removing inactive Diameter session information, a Diameter RAR message may be sent from DRA 114 to PCEF 112 for requesting information about each Diameter session that is potentially inactive.

At step 2005, for each Diameter session being evaluated in a PCRF audit, an RAA message may be sent from PCEF 112 to PCRF 116. For example, each RAA message may include a Result Code of '5002' indicating that a particular Diameter session is unknown.

At step 2006, for each Diameter session that is determined to be unknown by PCEF 112, corresponding Diameter session information may be removed or cleared in memory accessible by and/or located at PCRF 116.

While a PCRF audit mechanism as illustrated in FIG. 2 may be capable of clearing Diameter session information, various issues can arise using this technique. For example, since RAR messages and/or RAA messages can be re-transmitted multiple times, an audit procedure may increase network load (e.g., via increased messages) which can exacerbate network congestion or issues. Another issue is that resources at PCRF 116 are wasted by maintaining session information until an audit procedure is performed. Further, an audit procedure on a network node, such as PCRF 116, can be resource intensive procedure and may negatively affect its other functions.

It will be appreciated that FIG. 2 is for illustrative purposes and that different and/or additional messages and/or actions may be used. It will also be appreciated that various messages and/or actions described herein may occur in a different order or sequence.

Figure 3:
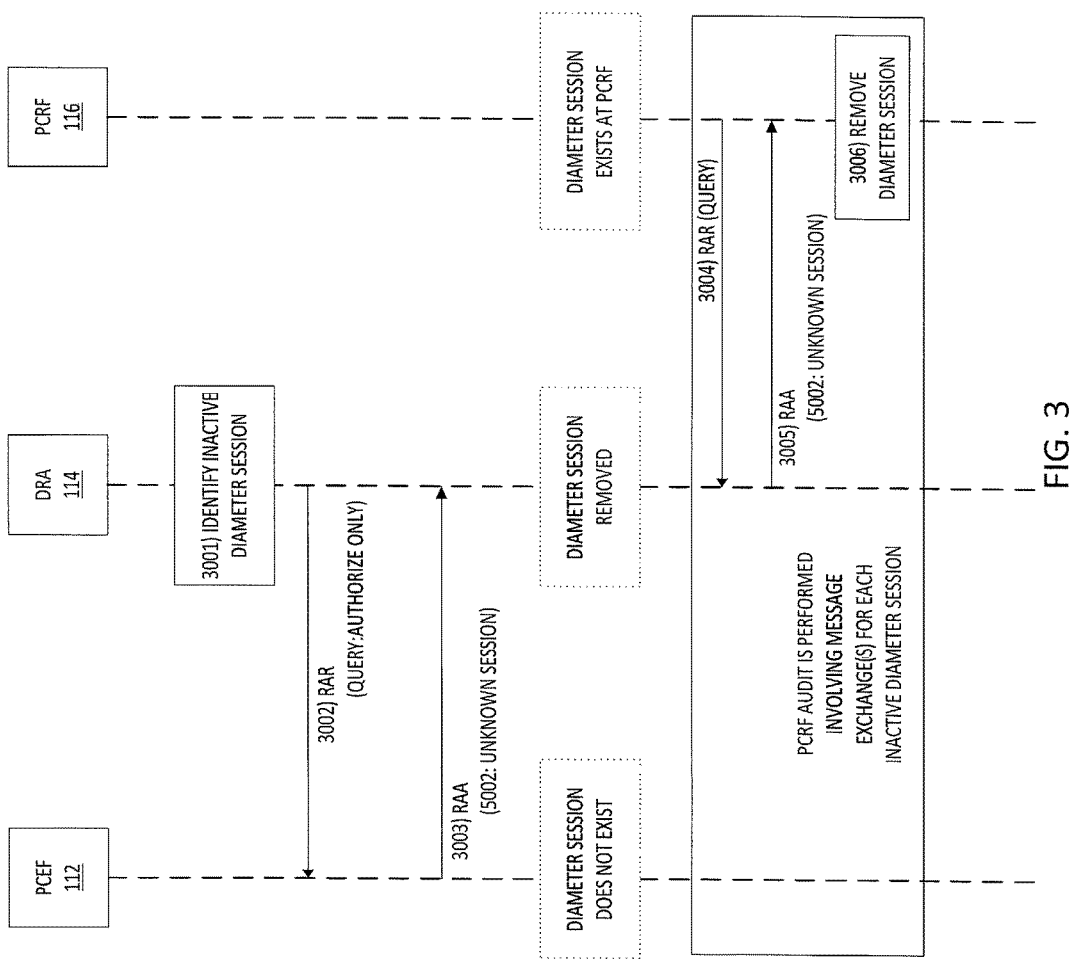
FIG. 3 is a message flow diagram illustrating another audit mechanism for clearing Diameter session information at a PCRF according to an embodiment of the subject matter described herein.

FIG. 3 is a message flow diagram illustrating another audit mechanism for clearing Diameter session information at PCRF 116 according to an embodiment of the subject matter described herein. In some embodiments, DRA 114 may facilitate communications between one or more nodes in carrier network 108. For example, DRA 114 may communicate with PCEF 112 and PCRF 116. In this example, DRA 114 and PCRF 116 may maintain state information and/or session information for various subscribers or UEs associated with PCEF 112.

In step 3001, DRA 114 may identify an active Diameter session. For example, DRA 114 may maintain timers or other mechanisms for determining or identifying whether a Diameter session associated with PCEF 112 is stale or inactive. In this example, DRA 114 may identify a Diameter session '5234' as inactive if a time threshold is met or exceeded without activity.

In step 3002, a Diameter RAR message may be sent from DRA 114 to PCEF 112 for requesting information about the Diameter session. For example, DRA 114 may send a Diameter RAR message to verify or confirm that the Diameter session is inactive.

In step 3003, a Diameter RAA message may be sent from PCEF 112 to DRA 114. For example, in response to receiving an RAR message, PCEF 112 may respond with an RAA message indicating that a particular Diameter session is unknown (e.g., the RAA message may include a Result code of '5002'). In this example, the RAA message may indicate that the Diameter session is unknown if the session is no longer connected or is inactive.

In some embodiments, after receiving an RAA message indicating that a Diameter session is unknown, DRA 114 may delete or clear information associated with the Diameter session. For example, DRA 114 may delete a data entry associated with a stale or inactive Diameter session '5234' in a local data structure or memory accessible by DRA 114.

In some embodiments, after DRA 114 has cleared session information related to an inactive Diameter session, PCRF 116 may be unaware of the Diameter session's inactive status and, as such, may continue to maintain information about the Diameter session, which may be an inefficient use of valuable resources and memory at PCRF 116.

In some embodiments, PCRF 116 may be configured to perform internal audits periodically to clear or delete stale or inactive Diameter session information. For example, every hour, PCRF 116 may perform an internal audit procedure that includes sending an RAR message for each potentially stale Diameter session to PCEF 112, e.g., via DRA 114 or another DRA. In this example, in response to determining that any Diameter sessions are unknown to PCEF 112, PCRF 116 may clean up session information associated with these unknown Diameter sessions at PCRF 116.

At step 3004, during a PCRF audit for removing stale or inactive Diameter session information, a Diameter RAR message may be sent from DRA 114 towards PCEF 112 for requesting information about each stale Diameter session.

In some embodiments, DRA 114 may intercept and/or respond to RAR messages associated with an audit procedure without forwarding the RAR messages onward to PCEF 112. For example, if DRA 114 is aware that Diameter session '5678' is unknown to PCEF 112 (e.g., based on a previous message exchange between DRA 114 and PCEF 112), DRA 114 may respond to an audit related request message (e.g., an RAR message) from PCRF 116 with an audit related answer message (e.g., an RAA message) indicating that Diameter session '5678' is unknown).

At step 3005, for each Diameter session being evaluated in a PCRF audit, an RAA message may be sent from DRA 114 to PCRF 116. For example, each RAA message may include a Result Code of '5002' indicating that a Diameter session is unknown. In some embodiments, DRA 114 may generate an RAA message that appears to originate from PCEF 112.

At step 3006, for each Diameter session that is determined to be unknown, corresponding Diameter session information may be removed or cleared in memory accessible by and/or located at PCRF 116.

It will be appreciated that FIG. 3 is for illustrative purposes and that different and/or additional messages and/or actions may be used. It will also be appreciated that various messages and/or actions described herein may occur in a different order or sequence.

Figure 4:
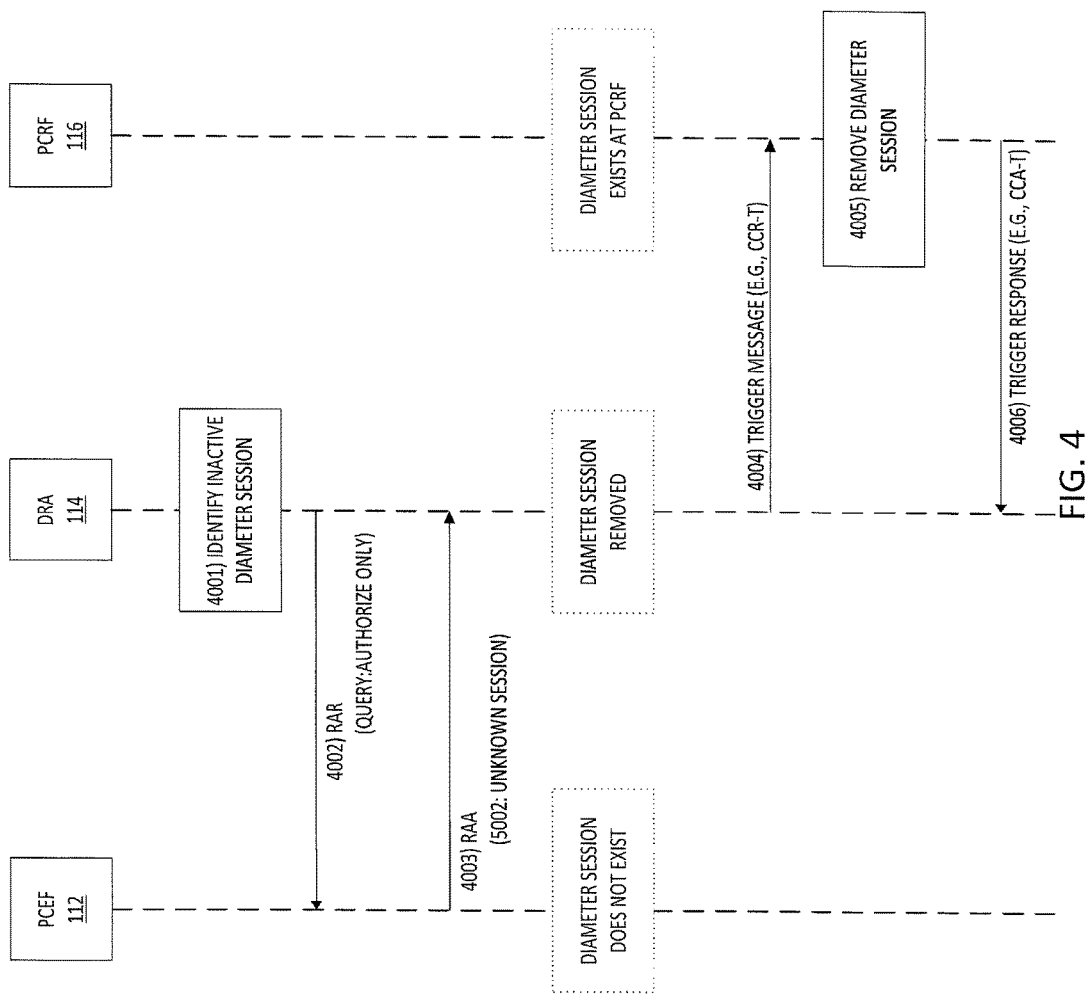
FIG. 4 is a message flow diagram illustrating clearing Diameter session information according to an embodiment of the subject matter described herein.

FIG. 4 is a message flow diagram illustrating clearing Diameter session information according to an embodiment of the subject matter described herein. In some embodiments, DRA 114 may facilitate communications between one or more nodes in carrier network 108. For example, DRA 114 may communicate with PCEF 112 and PCRF 116. In this example, DRA 114 and PCRF 116 may maintain state information and/or session information for various subscribers or UEs associated with PCEF 112.

In step 4001, DRA 114 may identify an inactive Diameter session. For example, DRA 114 may maintain timers or other mechanisms for determining or identifying whether a Diameter session associated with PCEF 112 is stale or inactive. In this example, DRA 114 may identify a Diameter session '5234' as inactive if a time threshold is met or exceeded without activity.

In step 4002, a Diameter RAR message may be sent from DRA 114 to PCEF 112 for requesting information about the Diameter session. For example, DRA 114 may send a Diameter RAR message to verify or confirm that the Diameter session is inactive.

In step 4003, a Diameter RAA message may be sent from PCEF 112 to DRA 114. For example, in response to receiving an RAR message, PCEF 112 may respond with an RAA message indicating that a particular Diameter session is unknown (e.g., the RAA message may include a Result code of '5002'). In this example, the RAA message may indicate that the Diameter session is unknown if the session is no longer connected or is inactive.

In some embodiments, after receiving an RAA message indicating that a Diameter session is unknown, DRA 114 may delete or clear information associated with the Diameter session. For example, DRA 114 may delete a data entry associated with a stale or inactive Diameter session '5234' in a local data structure or memory accessible by DRA 114.

In some embodiments, after DRA 114 has cleared session information related to an inactive Diameter session, PCRF 116 may be unaware of the Diameter session's inactive status and, as such, may continue to maintain information about the Diameter session, which may be an inefficient use of valuable resources and memory at PCRF 116.

In some embodiments, DRA 114 may be configured to trigger one or more Diameter nodes (e.g., PCRF 116, OCS 118, and/or other nodes) to clear stale or inactive Diameter session information. For example, instead of PCRF 116 initiating an audit procedure periodically, DRA 114 may generate and send a trigger message to PCRF 116 for clearing Diameter session information based on DRA 114 determining that a Diameter session is unknown to PCEF 112. In this example, DRA 114 may send the trigger message concurrently with, after, or before clearing session information locally (e.g., at DRA 114).

At step 4004, a trigger message, such as a CCR-T message, may be sent from DRA 114 towards PCRF 116 for triggering PCRF 116 to clear or delete session information associated with one or more inactive Diameter session. For example, a CCR-T message is generally sent by a PCEF 112 for indicating that a Diameter session is to be terminated. In this example, DRA 114 may impersonate PCEF 112 when sending a CCR-T message such that PCRF 116 responds by clearing session information associated with any Diameter session indicated in the CCR-T message.

At step 4005, after receiving the trigger message, corresponding Diameter session information may be removed or cleared in memory accessible by and/or located at PCRF 116. For example, after receiving a CCR-T message indicating that Diameter session '7689' is to be terminated, PCRF 116 may clear or delete session information associated with Diameter session '7689'.

At step 4006, a trigger response message, such a credit control answer terminate (CCA-T) message, may be sent from PCRF 116 to DRA 114. For example, a CCA-T message may indicate that a Diameter session indicated by a CCR-T message was terminated. In another example, a trigger response message may indicate that session information (e.g., stored at or by PCRF 116) associated with a particular Diameter session was cleared or deleted.

It will be appreciated that FIG. 4 is for illustrative purposes and that different and/or additional messages and/or or actions may be used. It will also be appreciated that various messages and/or actions described herein may occur in a different order or sequence.

Figure 5:
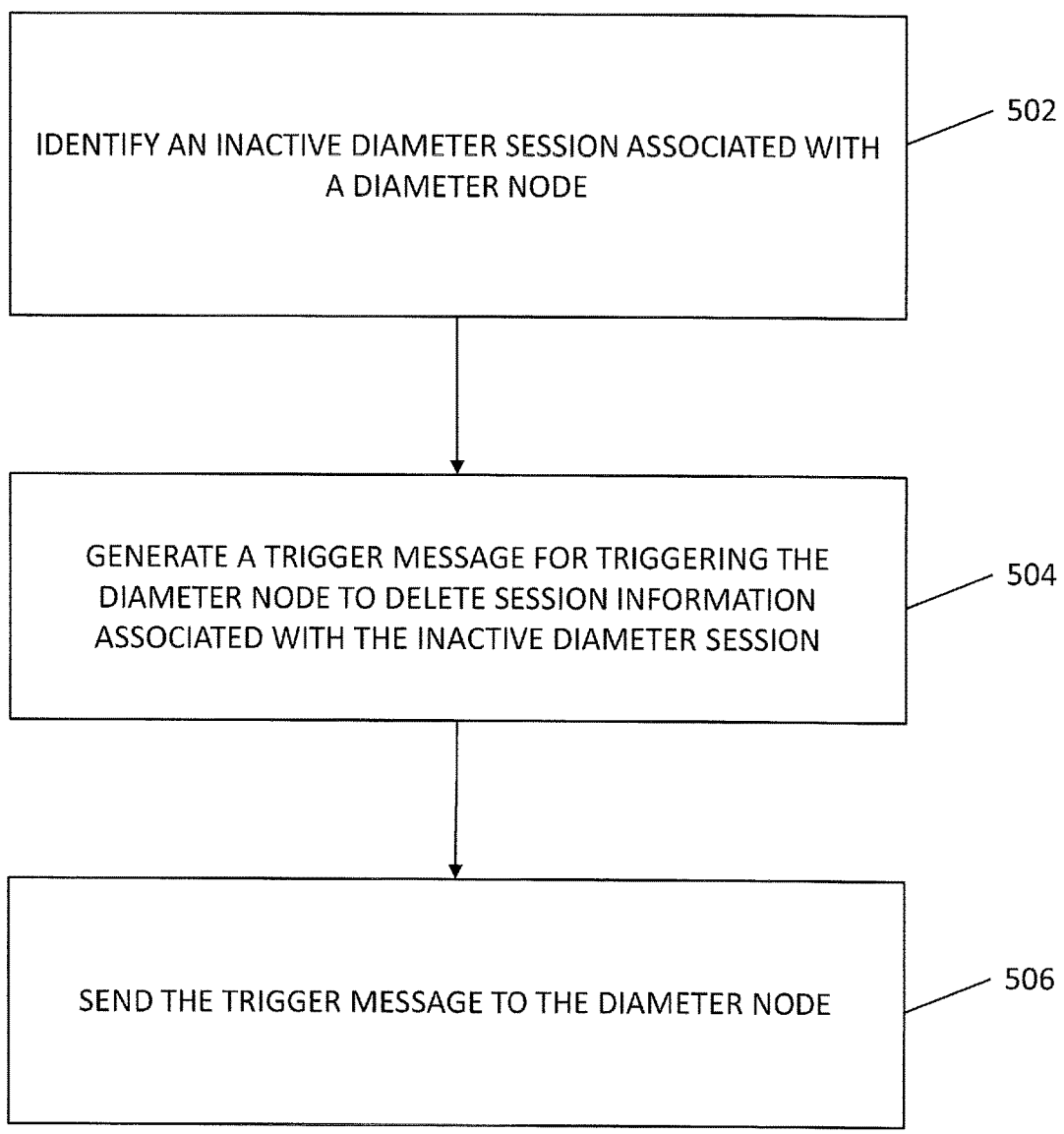
FIG. 5 is a flow chart illustrating a process for clearing Diameter session information according to an embodiment of the subject matter described herein.

FIG. 5 is a flow chart illustrating a process for clearing Diameter session information according to an embodiment of the subject matter described herein. In some embodiments, process 500, or portions thereof (e.g., steps 502, 504 and/or 506), may be performed by or at DRA 114 and/or another node or module.

Referring to process 500, in step 502, an inactive Diameter session associated with a Diameter node may be identified. For example, DRA 114 may maintain timers or other mechanisms for determining or identifying whether a Diameter session associated with PCEF 112 is stale or is inactive.

In step 504, a trigger message for triggering the Diameter node to delete session information associated with the inactive Diameter session may be generated. For example, DRA 114 may generate a CCR-T message including a session identifier indicating a stale or inactive Diameter session. In this example, the CCR-T message may be sent to PCRF 116, another DRA, OCS 118, and/or other Diameter nodes for clearing stored session information associated with the inactive Diameter session or its related session identifier.

In some embodiments, prior to generating a trigger message, DRA 114 may send a Diameter request message, such as an RAR message, to PCEF 112 requesting information about an inactive Diameter session and may receive a Diameter answer message, such as an RAA message, from PCEF 112 indicating that the inactive Diameter session is unknown to PCEF 112. For example, DRA 114 may confirm that a Diameter session is inactive by querying PCEF 112 or another node for information about the Diameter session.

In some embodiments, generating a trigger message may be in response to PCRF 116 sending an RAR message, e.g., during an audit procedure. In such embodiments, DRA 114 may respond by generating a trigger message including an RAA message that appears to originate from PCEF 112. For example, during a PCRF audit procedure, DRA 114 may receive RAR messages and respond to the RAR messages based on knowledge about various stale or inactive Diameter sessions. In this example, DRA 114 may assume if a Diameter session being evaluated by PCRF 116 (e.g., as indicated by an RAR message) is unknown to DRA 114 or if session information associated with the Diameter session has been recently cleared by DRA 114, DRA 114 may respond with an RAA message indicating that the Diameter message is unknown, thereby triggering PCRF 116 to delete or clear Diameter session information at PCRF 116 associated with the Diameter session.

In some embodiments, a trigger message may trigger a Diameter node to delete session information associated with multiple inactive Diameter sessions. For example, a trigger message may indicate that Diameter session '3453' and Diameter session '5675' are unknown and/or that Diameter session information associated with these sessions stored at PCRF 116 should be clear or deleted. In this example, by using a trigger message to trigger deleting session information associated with multiple inactive Diameter sessions, a number of message exchanges can be avoided since separate message exchanges are avoided for each Diameter session. By minimizing the number of message exchanges involved, network related issues (e.g., congestion) may be alleviated compared to other techniques associated with clearing stale or inactive Diameter session information.

In some embodiments, a trigger message may appear to originate from PCEF 112. For example, DRA 114 may generate a CCR-T message that includes addressing information or identifying information associated with PCEF 112 such that the CCR-T message appears to originate from PCEF 112.

In step 506, the trigger message may be sent to the Diameter node. In some embodiments, a Diameter node that receives a trigger message for deleting stale or inactive Diameter session information may include a second DRA node, PCEF 112, PCRF 116, or OCS 118.

In some embodiments, after receiving a trigger message, a Diameter node may delete session information associated with an inactive Diameter session at the Diameter node. For example, DRA 114 may send a CCR-T message or another trigger message to PCRF 116 and, in response to receiving the CCR-T message, PCRF 116 may clear or delete stale or inactive Diameter session information stored at or by PCRF 116.

In some embodiments, after sending a trigger message to a Diameter node, a response message may be receive from the Diameter node. For example, OCS 118 may receive a CCR-T message from DRA 114. In this example, in response to receiving the CCR-T message, OCS 118 may send a response message, such as a CCA-T message.

It will be appreciated that process 500 is for illustrative purposes and that different and/or additional actions may be used. It will also be appreciated that various actions described herein may occur in a different order or sequence.

It should be noted that DRA 114 and/or functionality described herein may constitute a special purpose computing device. Further, DRA 114 and/or functionality described herein can improve the technological field of data management and resource utilization by using techniques, methods, and/or mechanisms that proactively and/or efficiently clear stale or inactive Diameter session information stored at or by network nodes (e.g., PCRF 116, peer DRAs, and/or OCS 118).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for clearing Diameter session information, the method comprising:
    at a Diameter routing agent (DRA) node acting as an intermediate node between a policy and charging enforcement function (PCEF) node and a policy and charging rules function (PCRF) node, wherein the DRA node is separate from the PCEF node and wherein the DRA node is separate from the PCRF node:
        identifying an inactive Diameter session associated with a Diameter node, wherein the Diameter node is the PCRF node;
        sending a Diameter request message to the PCEF node requesting information about the inactive Diameter session and receiving a Diameter answer message from the PCEF node indicating that the inactive Diameter session is unknown to the PCEF node;
        after receiving the Diameter answer message from the PCEF node, generating a trigger message for triggering the Diameter node to delete session information associated with the inactive Diameter session, wherein generating the trigger message is in response to the PCRF node sending a Re-Auth-Request (RAR) message intended for the PCEF node and wherein the trigger message includes a Re-Auth-Answer (RAA) message; and
        sending the trigger message to the Diameter node.

2. The method of claim 1 wherein after receiving the trigger message, the Diameter node deletes the session information associated with the inactive Diameter session at the Diameter node.

3. The method of claim 1 wherein the trigger message includes a credit control request terminate (CCR-T) message.

4. The method of claim 1 wherein the trigger message triggers the Diameter node to delete session information associated with multiple inactive Diameter sessions.

5. The method of claim 1 wherein the trigger message appears to originate from the PCEF node.

6. The method of claim 1 comprising:
    receiving a response message from the Diameter node.

7. The method of claim 6 wherein the response message includes a credit control answer terminate (CCA-T) message.

8. The method of claim 1 wherein the DRA node sends a second trigger message for triggering a second Diameter node to delete session information associated with the inactive Diameter session, wherein the second Diameter node includes a second DRA node or an online charging system (OCS).

9. A system for clearing Diameter session information, the system comprising:
    a Diameter routing agent (DRA) node acting as an intermediate node between a policy and charging enforcement function (PCEF) node and a policy and charging rules function (PCRF) node, wherein the DRA node is separate from the PCEF node and wherein the DRA node is separate from the PCRF node, wherein the DRA node comprises:
        a processor; and
        a memory,
        wherein the DRA node is configured to identify an inactive Diameter session associated with a Diameter node, wherein the Diameter node is the PCRF node; to send a Diameter request message to the PCEF node requesting information about the inactive Diameter session and receiving a Diameter answer message from the PCEF node indicating that the inactive Diameter session is unknown to the PCEF node; after receiving the Diameter answer message from the PCEF node, to generate a trigger message for triggering the Diameter node to delete session information associated with the inactive Diameter session, wherein generating the trigger message is in response to the PCRF node sending a Re-Auth-Request (RAR) message intended for the PCEF node and wherein the trigger message includes a Re-Auth-Answer (RAA) message; and to send the trigger message to the Diameter node.

10. The system of claim 9 wherein after receiving the trigger message, the Diameter node deletes the session information associated with the inactive Diameter session at the Diameter node.

11. The system of claim 9 wherein the trigger message includes a credit control request terminate (CCR-T) message.

12. The system of claim 9 wherein the trigger message triggers the Diameter node to delete session information associated with multiple inactive Diameter sessions.

13. The system of claim 9 wherein the trigger message appears to originate from the PCEF node.

14. The system of claim 9 wherein the DRA node is configured to receive a response message from the Diameter node.

15. The system of claim 9 wherein the DRA node sends a second trigger message for triggering a second Diameter node to delete session information associated with the inactive Diameter session, wherein the second Diameter node includes a second DRA node or an online charging system (OCS).

16. A non-transitory computer readable medium comprising computer executable instructions that when executed by a processor of a Diameter routing agent (DRA) node cause the DRA node to perform steps comprising:
    at the DRA node, wherein the DRA node is acting as an intermediate node between a policy and charging enforcement function (PCEF) node and a policy and charging rules function (PCRF) node, wherein the DRA node is separate from the PCEF node and wherein the DRA node is separate from the PCRF node:

identifying an inactive Diameter session associated with a Diameter node, wherein the Diameter node is the PCRF node;

sending a Diameter request message to the PCEF node requesting information about the inactive Diameter session and receiving a Diameter answer message from the PCEF node indicating that the inactive Diameter session is unknown to the PCEF node;

after receiving the Diameter answer message from the PCEF node, generating a trigger message for triggering the Diameter node to delete session information associated with the inactive Diameter session, wherein generating the trigger message is in response to the PCRF node sending a Re-Auth-Request (RAR) message intended for the PCEF node and wherein the trigger message includes a Re-Auth-Answer (RAA) message; and sending the trigger message to the Diameter node.

* * * * *